US009330595B2

(12) United States Patent
Park

(10) Patent No.: US 9,330,595 B2
(45) Date of Patent: May 3, 2016

(54) ORGANIC LIGHT EMITTING DISPLAY DEVICE AND DRIVING METHOD THEREOF

(75) Inventor: Jung-Kook Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 840 days.

(21) Appl. No.: 12/857,875

(22) Filed: Aug. 17, 2010

(65) Prior Publication Data

US 2011/0102418 A1 May 5, 2011

(30) Foreign Application Priority Data

Nov. 4, 2009 (KR) ........................ 10-2009-0105982

(51) Int. Cl.
*G06F 3/038* (2013.01)
*G09G 3/32* (2016.01)

(52) U.S. Cl.
CPC ...... *G09G 3/3233* (2013.01); *G09G 2300/0842* (2013.01); *G09G 2300/0861* (2013.01); *G09G 2310/066* (2013.01); *G09G 2320/0295* (2013.01); *G09G 2320/043* (2013.01); *G09G 2320/045* (2013.01)

(58) Field of Classification Search
CPC .......... G09G 2320/043; G09G 3/3233; G09G 2320/0295; G09G 3/3291; G09G 2320/0233; G09G 2300/0866; G09G 2310/027; G09G 2320/045; G09G 3/3283; G09G 2360/16; G09G 3/3225; G09G 2320/02; G02F 1/136286
USPC .................................... 345/76–107, 214, 690
See application file for complete search history.

(56) References Cited

U.S. PATENT DOCUMENTS

| | | | | |
|---|---|---|---|---|
| 7,148,871 | B2 * | 12/2006 | Sekine | 345/98 |
| 7,567,229 | B2 * | 7/2009 | Kasai et al. | 345/89 |
| 8,358,256 | B2 * | 1/2013 | Hamer et al. | 345/77 |

(Continued)

FOREIGN PATENT DOCUMENTS

| | | | |
|---|---|---|---|
| KR | 10-2005-0045814 | A | 5/2005 |
| KR | 10-2005-0097933 | A | 10/2005 |

(Continued)

OTHER PUBLICATIONS

KIPO Office Action dated Dec. 15, 2011, issued to KR patent application No. 10-2009-0105982, 1 sheet.

(Continued)

*Primary Examiner* — Aneeta Yodichkas
*Assistant Examiner* — Gerald Oliver
(74) *Attorney, Agent, or Firm* — Lewis Roca Rothgerber Christie LLP

(57) ABSTRACT

An organic light emitting display device is configured to compensate for deterioration of organic light emitting diodes (OLEDs) included in the device. The organic light emitting display device includes: a plurality of pixels; a timing controller for generating a comparison signal to determine a deterioration degree of an OLED included in each of the pixels; a sensing unit for sensing a deterioration information of the OLED; a supply time controller coupled between data lines and a data driver; a compensation unit for controlling the supply time controller so that a supply time of a data signal varies to correspond to the deterioration information and the comparison signal; and a switching unit coupled to the data lines, the sensing unit, and the supply time controller. The switching unit is configured to selectively couple the data lines to the sensing unit or the supply time controller.

18 Claims, 7 Drawing Sheets

(56) References Cited

U.S. PATENT DOCUMENTS

| | | | | |
|---|---|---|---|---|
| 2002/0140659 | A1* | 10/2002 | Mikami et al. | 345/90 |
| 2006/0125738 | A1* | 6/2006 | Kim et al. | 345/76 |
| 2006/0208973 | A1* | 9/2006 | Lee et al. | 345/76 |
| 2007/0024540 | A1* | 2/2007 | Ryu et al. | 345/76 |
| 2008/0036704 | A1* | 2/2008 | Kim et al. | 345/76 |
| 2008/0238953 | A1* | 10/2008 | Ogura | 345/697 |
| 2008/0284691 | A1* | 11/2008 | Chung et al. | 345/76 |
| 2009/0027377 | A1* | 1/2009 | Kwon | 345/214 |
| 2009/0051628 | A1* | 2/2009 | Kwon | 345/77 |
| 2009/0147032 | A1* | 6/2009 | Kim | 345/690 |
| 2009/0167648 | A1* | 7/2009 | Jeon et al. | 345/76 |
| 2009/0184896 | A1* | 7/2009 | Kwon | 345/76 |
| 2009/0213046 | A1* | 8/2009 | Nam | 345/76 |
| 2009/0284452 | A1* | 11/2009 | Takata et al. | 345/77 |
| 2010/0039411 | A1* | 2/2010 | Yatabe et al. | 345/204 |

FOREIGN PATENT DOCUMENTS

| | | | | |
|---|---|---|---|---|
| KR | 10-2006-0115519 | A | * 11/2006 | 345/77 |
| KR | 10-2008-0017903 | A | 2/2008 | |
| KR | 100846970 | B1 | 7/2008 | |
| KR | 1020080066421 | A | 7/2008 | |
| KR | 100858615 | B1 | 9/2008 | |
| KR | 1020090020190 | A | 2/2009 | |
| KR | 10-0902245 | | 6/2009 | |

OTHER PUBLICATIONS

KIPO Office action dated May 9, 2011, in priority Korean application No. 10-2009-0105982, 6 pps.

* cited by examiner

ORGANIC LIGHT EMITTING DISPLAY DEVICE AND DRIVING METHOD THEREOF

CROSS-REFERENCE TO RELATED APPLICATION

This application claims priority to and the benefit of Korean Patent Application No. 10-2009-0105982, filed on Nov. 4, 2009, in the Korean Intellectual Property Office, the entire content of which is incorporated herein by reference.

BACKGROUND

1. Field

Aspects of embodiments of the present invention relate to an organic light emitting display device and a driving method thereof.

2. Description of Related Art

Various flat panel display devices with reduced weight and volume in comparison to a cathode ray tube have been developed. Examples of the flat panel display devices include a liquid crystal display device, a field emission display device, a plasma display panel, an organic light emitting display device, etc.

Among the flat panel display devices, the organic light emitting display device displays an image by using organic light emitting diodes that emit light by recombining holes with electrons. The organic light emitting display device may be driven at low power consumption while having rapid response speed.

SUMMARY

Aspects of exemplary embodiments of the present invention relate to an organic light emitting display device configured to compensate for a deterioration of an organic light emitting diode included in the device.

According to one embodiment of the present invention, an organic light emitting display device includes: a plurality of pixels at crossing regions of data lines, scan lines, and sensing lines; a timing controller for generating a comparison signal to determine a deterioration degree of an organic light emitting diode included in each of the pixels; a sensing unit for sensing a deterioration information of the organic light emitting diode; a supply time controller coupled between the data lines and a data driver; a compensation unit for controlling the supply time controller so that a supply time of a data signal varies in accordance with the deterioration information and the comparison signal; and a switching unit coupled to the data lines, the sensing unit, and the supply time controller, the switching unit being configured to selectively couple the data lines to the sensing unit or the supply time controller.

The comparison signal may include a triangular wave.

The supply time controller may include a transistor coupled to a corresponding one of the data lines.

The compensation unit may include: a comparator in each of a plurality of channels, each of the channels including at least one of the data lines, the comparator being configured to compare the comparison signal with the deterioration information; and a controller coupled with the comparator, the controller being configured to control a turn-on time of the transistor to correspond to a comparison result of the comparator.

The controller may be configured to control the turn-on time so as to compensate for deterioration of the organic light emitting diode.

The comparator may be configured to generate a first voltage when the voltage of the comparison signal is higher than the voltage of the deterioration information and otherwise, to generate a second voltage that is higher than the first voltage.

The controller may be configured to control the turn-on time of the transistor in proportion to a duration of a period in which the first voltage is supplied from the comparator.

The organic light emitting display device may further include: a scan driver for sequentially supplying a scan signal to the scan lines; a sensing line driver for sequentially supplying a sensing signal to the sensing lines; and a data driver for supplying a data signal to the data lines.

The sensing line driver may be configured to sequentially supply the sensing signal during a sensing period which is a first period of a horizontal period, and the scan line driver may be configured to sequentially supply the scan signal during a driving period which is a second period of the horizontal period.

The transistor may be configured to be turned on during at least a part of the driving period.

The switching unit may include: a first switching element coupled between a corresponding one of the data lines and the supply time controller; and a second switching element coupled between the corresponding one of the data lines and the sensing unit.

The first switching element may be configured to be turned on during the driving period, and the second switching element may be configured to be turned on during the sensing period.

The sensing unit may include: at least one current source for supplying a current to the organic light emitting diode; and at least one switching element coupled between the current source and the data lines.

The at least one switching element may be configured to be turned on during the sensing period.

A current value of the current may be the same as a current value of a current that flows through the organic light emitting diode and corresponds to a maximum luminance of one of the pixels.

According to another embodiment of the present invention, a driving method of an organic light emitting display device is provided. The method includes: determining a deterioration information of an organic light emitting diode included in a pixel while applying a current to the organic light emitting diode; comparing a voltage of a comparison signal with a voltage of the deterioration information to generate a comparison result; and controlling a supply time of a data signal supplied to the pixel in accordance with the comparison result.

The comparison signal may include a triangular wave.

As the organic light emitting diode deteriorates, the voltage of the deterioration information may increase.

The comparison result may vary as the organic light emitting diode deteriorates such that the supply time of the data signal supplied to the pixel may be reduced.

The deterioration information and the comparison signal may be compared with each other during a sensing period which is a first period of one horizontal period, and the supply time of the data signal may be controlled during a driving period which is a second period different from the first period of the horizontal period.

BRIEF DESCRIPTION OF THE DRAWINGS

The accompanying drawings, together with the specification illustrate exemplary embodiments of the present invention, and, together with the description, serve to explain the principles and aspects of the present invention.

DETAILED DESCRIPTION

Figure 1:
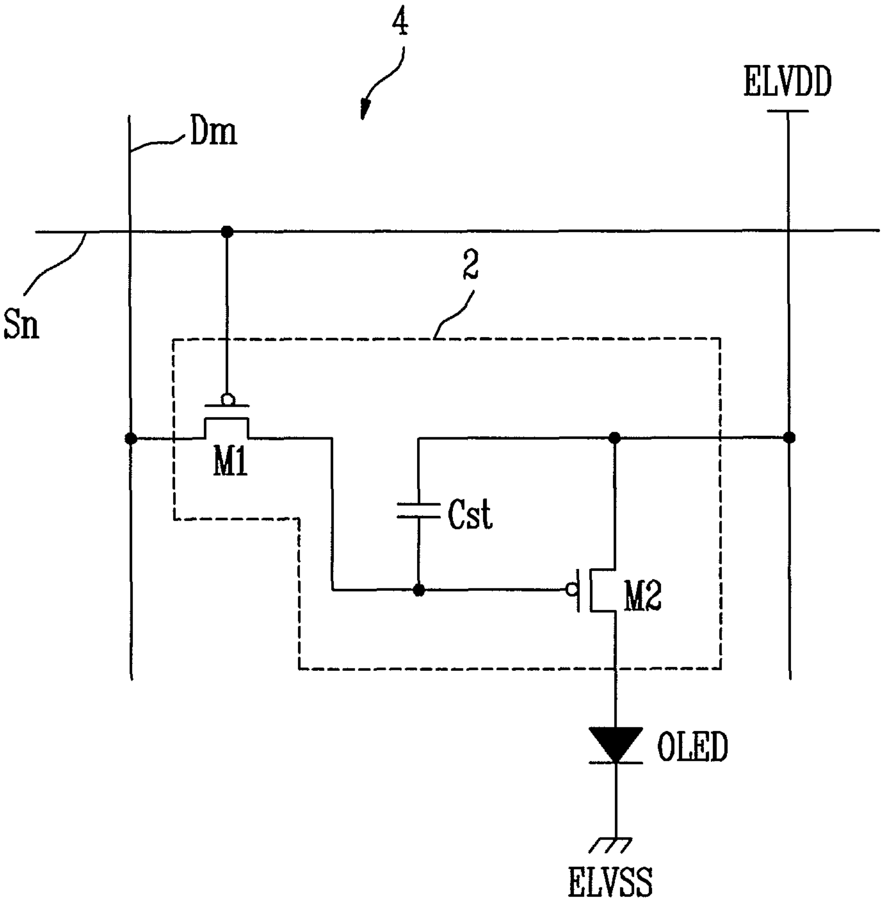
FIG. 1 is a circuit diagram showing a pixel.

Hereinafter, certain exemplary embodiments according to the present invention will be described with reference to the accompanying drawings. Here, when a first element is described as being coupled or connected to a second element, the first element may be directly coupled to the second element, or indirectly coupled to the second element via a third element. Further, some of the elements that are not essential to the complete understanding of the invention are omitted for clarity. Also, like reference numerals refer to like elements throughout.

FIG. 1 is a circuit diagram showing a pixel of a conventional organic light emitting display device.

Referring to FIG. 1, the pixel 4 of the organic light emitting display device includes an organic light emitting diode (OLED) and a pixel circuit 2 for controlling the OLED by being connected to a data line Dm and a scan line Sn.

An anode electrode of the OLED is connected to the pixel circuit 2, and a cathode electrode of the OLED is connected to a second power supply ELVSS. The OLED generates light having a luminance (e.g., a predetermined luminance) that corresponds to the amount of current supplied from the pixel circuit 2.

The pixel circuit 2 controls the amount of current supplied to the OLED to correspond to a data signal supplied from the data line Dm when a scan signal is supplied to the scan line Sn.

In FIG. 1, the pixel circuit 2 includes a second transistor M2 connected between a first power supply ELVDD and the OLED, a first transistor M1 connected to the second transistor M2, the data line Dm, and the scan line Sn, and a storage capacitor Cst connected between a gate electrode and a first electrode of the second transistor M2.

A gate electrode of the first transistor M1 is connected to the scan line Sn, and the first electrode of the first transistor M1 is connected to the data line Dm. In addition, a second electrode of the first transistor M1 is connected to one terminal of the storage capacitor Cst.

Here, the first electrode may be any one of a source electrode or a drain electrode, and the second electrode is an electrode other than the first electrode. For example, when the first electrode is the source electrode, the second electrode is the drain electrode. The first transistor M1 connected to the scan line Sn and the data line Dm is turned on when the scan signal is supplied from the scan line Sn, such that the data signal supplied from the data line Dm is supplied to the storage capacitor Cst. Here, the storage capacitor Cst is charged with a voltage corresponding to the data signal.

The gate electrode of the second transistor M2 is connected to one terminal of the storage capacitor Cst, and the first electrode of the second transistor M2 is connected to the other terminal of the storage capacitor Cst and the first power supply ELVDD. In addition, a second electrode of the second transistor M2 is connected to the anode electrode of the OLED.

The second transistor M2 controls the amount of current that flows to the second power supply ELVSS via the OLED from the first power supply ELVDD to correspond to a voltage value stored in the storage capacitor Cst. Here, the OLED generates light corresponding to the amount of current supplied from the second transistor M2.

However, the organic light emitting display device of FIG. 1 may not display an image having a desired luminance due to a change in efficiency of the OLED caused by the deterioration of the OLED.

As time passes, the OLED is deteriorated, such that the luminance of light generated to correspond to the same data signal gradually decreases.

In order to address the above described problem, patent applications (Korean Patent Application No. 2007-0035012 and 2007-0084730) disclose extracting deterioration information of an organic light emitting diode while supplying current to the organic light emitting diode have been applied.

In the above referenced patent applications, the voltage of the data signal is adjusted so as to compensate for the deterioration of the organic light emitting diode. However, in case of adjusting the voltage of the data signal to correspond to the deterioration of the organic light emitting diode, circuit complexity (for example, a plurality of resistors are additionally included in a gamma voltage part and additional circuits are included in a timing controller) and sizes of the data driver and the timing controller increase due to a memory included for storing deterioration information. Further, in case of adjusting the voltage of the data signal, minute deterioration of the organic light emitting diode may not be compensated for and a gamma value may be changed depending on the degree of deterioration.

Hereinafter, exemplary embodiments of the present invention will be described in detail with reference to FIGS. 2 to 8B.

Figure 2:
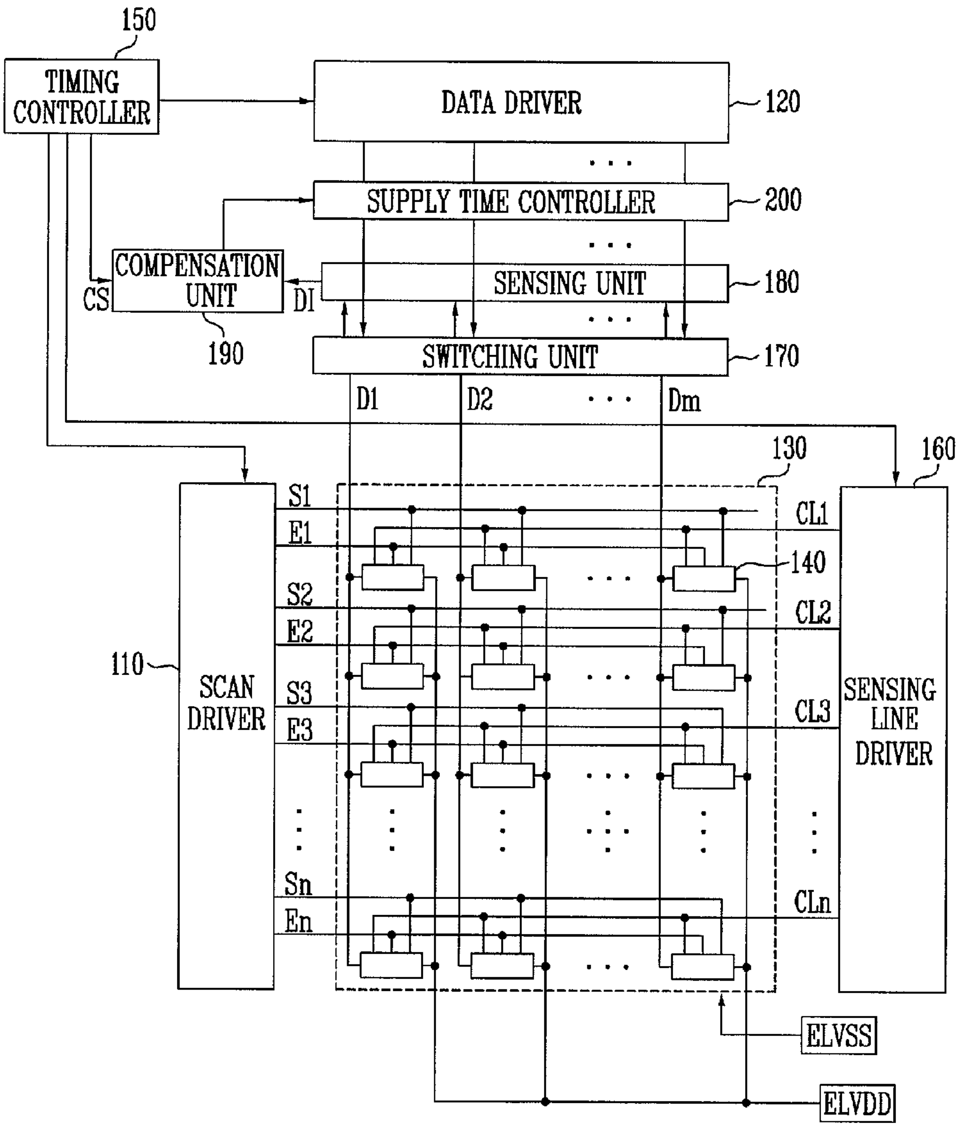
FIG. 2 is a diagram showing an organic light emitting display device according to an embodiment of the present invention.

FIG. 2 is a diagram showing an organic light emitting display device according to an embodiment of the present invention.

Referring to FIG. 2, the organic light emitting display device includes a display unit 130 including pixels 140 that are connected with scan lines S1 to Sn, emission control lines E1 to En, sensing lines CL1 to CLn, and data lines D1 to Dm, a scan driver 110 for driving the scan lines S1 to Sn and the emission control lines E1 to En, a sensing line diver 160 for driving the sensing lines CL1 to CLn, a data driver 120 for driving the data lines D1 to Dm, and a timing controller 150 for controlling the scan driver 110, the data driver 120, and the sensing line driver 160.

Further, the organic light emitting display device according to one embodiment of the present invention includes a sensing unit 180 for extracting deterioration information DI of an organic light emitting diode included in each of the pixels 140, a switching unit 170 for selectively connecting the sensing unit 180 and the data driver 120 to the data lines D1 to Dm, a compensation unit 190 for controlling a supply time controller 200 by using the deterioration information DI extracted by the sensing unit 180 and a comparison signal CS supplied from the timing controller 150, and the supply time controller 200 for controlling a supply time of a data signal to correspond to a control of the compensation unit 190.

The display unit 130 includes the pixels 140 formed at crossing regions of the scan lines S1 to Sn, the emission control lines E1 to En, and the data lines D1 to Dm. Each of the pixels 140 receives power from a first power supply ELVDD and a second power supply ELVSS from the outside. The pixels 140 control the amount of current supplied from the first power supply ELVDD to the second power supply ELVSS via an organic light emitting diode (OLED) to correspond to the data signal. Then, the OLED generates light having a luminance (e.g., a predetermined luminance).

The scan driver 110 sequentially supplies a scan signal to the scan lines S1 to Sn while being controlled by the timing controller 150. Further, the scan driver 110 supplies an emission control signal to the emission control lines E1 to En while being controlled by the timing controller 150. Here, one horizontal period 1H is divided into a first period (sensing period) and a second period (driving period). The scan signal supplied to the scan lines S1 to Sn is supplied during the driving period.

The sensing line driver 160 sequentially supplies a sensing signal to the sensing lines CL1 to CLn while being controlled by the timing controller 150. Here, the sensing signal supplied to the sensing lines CL1 to CLn is supplied during the sensing period.

The data driver 120 supplies the data signal to the data lines D1 to Dm to be synchronized with the scan signal while being controlled by the timing controller 150.

The switching unit 170 selectively connects the sensing unit 180 and the supply time controller 200 to the data lines D1 to Dm. Here, the switching unit 170 includes pairs of switching elements, each pair connected with a corresponding one of the data lines D1 to Dm (that is, for each channel).

The sensing unit 180 extracts the deterioration information DI of the organic light emitting diode included in each of the pixels 140 and supplies the extracted deterioration information DI to the compensation unit 190. Here, the sensing unit 180 includes a sensing circuit connected with each of the data lines D1 to Dm, that is, installed for each channel. Here, sensing the deterioration information DI of the organic light emitting diode is performed during the sensing period of the horizontal period 1H.

The compensation unit 190 compares the comparison signal CS supplied from the timing controller 150 with the deterioration information DI supplied from the sensing unit 180 and controls the supply time controller 200 to correspond to the comparison result. Here, the compensation unit 190 includes a comparator for comparing the comparison signal CS with the deterioration information DI and a controller for controlling the supply time controller 200 to correspond to the result of the comparator.

The timing controller 150 controls the data driver, the scan driver 110, and the sensing line driver 160. Further, the timing controller 150 supplies the comparison signal CS to the compensation unit 190. In one embodiment, the comparison signal CS is set as a triangular wave so as to determine a voltage level of the deterioration information DI.

The supply time controller 200 is connected between the switching unit 170 and the data driver 120. The supply time controller 200 controls the supply time of the data signal applied to each of the data lines D1 to Dm from the data driver 120 by using one or more transistors that is positioned in each channel and controlled by the compensation unit 190. Here, the supply time of the data signal is set to compensate for the deterioration of the organic light emitting diode included in each of the pixels 140.

Figure 3:
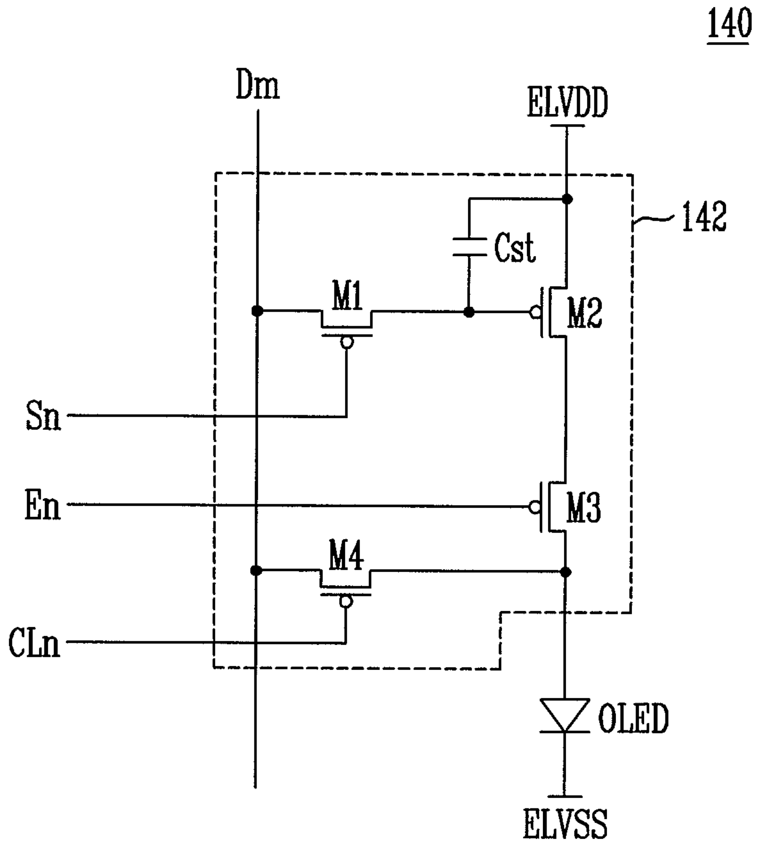
FIG. 3 is a diagram showing an embodiment of a pixel shown in FIG. 2.

FIG. 3 shows an embodiment of a pixel shown in FIG. 2 and shows the pixel as connected to an m-th data line Dm and an n-th scan line Sn for the convenience of description.

Referring to FIG. 3, the pixel 140 according to one embodiment of the present invention includes an organic light emitting diode (OLED) and a pixel circuit 142 for supplying current to the OLED.

An anode electrode of the OLED is connected to the pixel circuit 142, and a cathode electrode of the OLED is connected to the second power supply ELVSS. The OLED generates light having a luminance (e.g., a predetermined luminance) corresponding to the amount of current supplied from the pixel circuit 142.

The pixel circuit 142 is supplied with the data signal from the data line Dm during at least a part of the driving period when the scan signal is supplied to the scan line Sn. Further, the pixel circuit 142 provides the deterioration information DI of the OLED to the sensing unit 180 during the sensing period when the sensing signal is supplied to the sensing line CLn. Here, the pixel circuit 142 includes four transistors M1 to M4 and a storage capacitor Cst.

The gate electrode the first transistor M1 is connected to the scan line Sn, and the first electrode of the first transistor M1 is connected to the data line Dm. In addition, the second electrode of the first transistor M1 is connected to a first terminal of the storage capacitor Cst. The first transistor M1 is turned on when the scan signal is supplied to the scan line Sn.

The gate electrode of the second transistor M2 is connected to the first terminal of the storage capacitor Cst, and the first electrode of the second transistor M2 is connected to a second terminal of the storage capacitor Cst and the first power supply ELVDD. The second transistor M2 controls the amount of current that flows to the second power supply ELVSS via the OLED from the first power supply ELVDD in accordance with a voltage value stored in the storage capacitor Cst. Here, the OLED generates light having a luminance corresponding to the amount of current supplied from the second transistor M2.

The gate electrode of the third transistor M3 is connected to the emission control line En, and the first electrode of the third transistor M3 is connected to the second electrode of the second transistor M2. In addition, the second electrode of the second transistor M2 is connected to the OLED. The third transistor M3 is turned off when the emission control signal is supplied to the emission control line En and turned on when the emission control signal is not supplied. Here, the emission control signal is supplied during the driving period when the voltage corresponding to the data signal is charged in the storage capacitor Cst and the sensing period when the deterioration information of the OLED is sensed.

The gate electrode of the fourth transistor M4 is connected to the sensing line CLn, and a first electrode of the fourth transistor M4 is connected to the second electrode of the third transistor M3. Further, the second electrode of the fourth transistor M4 is connected to the data line Dm. The fourth transistor M4 is turned on when the sensing signal is supplied to the sensing line CLn, and otherwise, the fourth transistor M4 is turned off.

Figure 4:
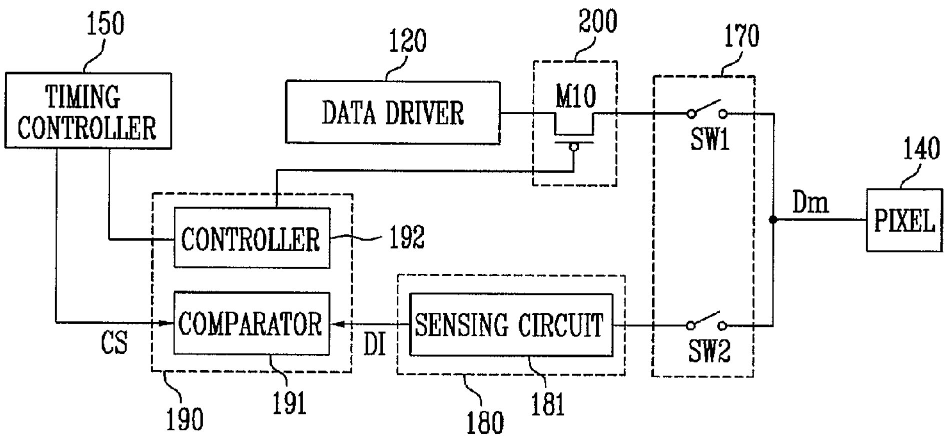
FIG. 4 is a diagram showing a switching unit, a sensing unit, a compensation unit, and a supply time controller shown in FIG. 2, according to an embodiment of the present invention.
Figure 5:
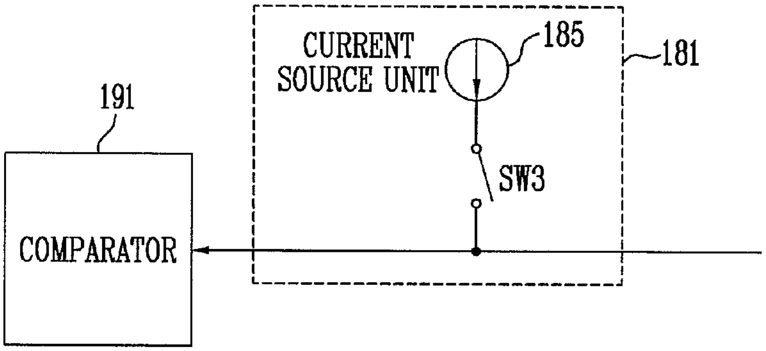
FIG. 5 is a diagram showing a sensing circuit shown in FIG. 4, according to an embodiment of the present invention.

FIG. 4 is a diagram showing a switching unit, a sensing unit, a compensation unit, and a supply time controller shown in FIG. 2, according to one embodiment of the present invention. In FIG. 4, a configuration connected to an m-th data line Dm is shown for the convenience of description.

Referring to FIG. 4, the switching unit 170 includes a pair of switching elements SW1 and SW2 formed in each channel and the sensing unit 180 includes a sensing circuit 181 formed in each channel. In addition, the compensation unit 190 includes a comparator 191 and a controller 192 formed in each channel and the supply time controller 200 includes a tenth transistor M10 formed in each channel.

The sensing circuit 181 is provided in each channel of the sensing unit 180. The sensing circuit 181 supplies a current (e.g., a predetermined current) to the pixel 140 during a period when the second switching element SW2 is turned on. In one embodiment of the present invention, the sensing circuit 181 includes a current source unit 185 and a third switching element SW3 connected between the current source unit 185 and the second switching element SW2.

The current source unit 185 supplies a first current to the pixel 140 when the third switching element SW3 is turned on. The first current supplied to the pixel 140 is supplied via the OLED included in the pixel 140. In this case, a voltage (e.g., a predetermined voltage) corresponding to the first current is applied to the OLED, and the voltage is supplied to the comparator 191 as the deterioration information DI. For example, a current value of the first current is experimentally determined so as to apply the voltage within a set time (e.g., the sensing period). For example, the first current may be set to the same current value as a current that flows through the OLED when the pixel 140 emits light at the maximum luminance.

Here, the voltage applied to the OLED by the first current varies depending on the degree of deterioration of the OLED. That is, as the OLED is deteriorated, the resistance value of the OLED increases. In this case, the voltage applied to the OLED by the first current varies depending on the degree of deterioration, such that the deterioration information of the OLED can be extracted.

The switching unit 170 includes the first switching element SW1 connected between the data line Dm and the data driver 120 and the second switching element SW2 connected between the data line Dm and the sensing unit 180. The first switching element SW1 is turned on during the driving period included in each horizontal period, and the second switching element SW2 is turned on during the sensing period included in each horizontal period.

The compensation unit 190 includes a comparator 191 and a controller 192. The comparator 191 compares the comparison signal CS supplied from the timing controller 150 with the deterioration information DI supplied from the sensing unit 181, and the controller 192 controls the supply time controller 200 to correspond to the comparison result.

Figure 7A:
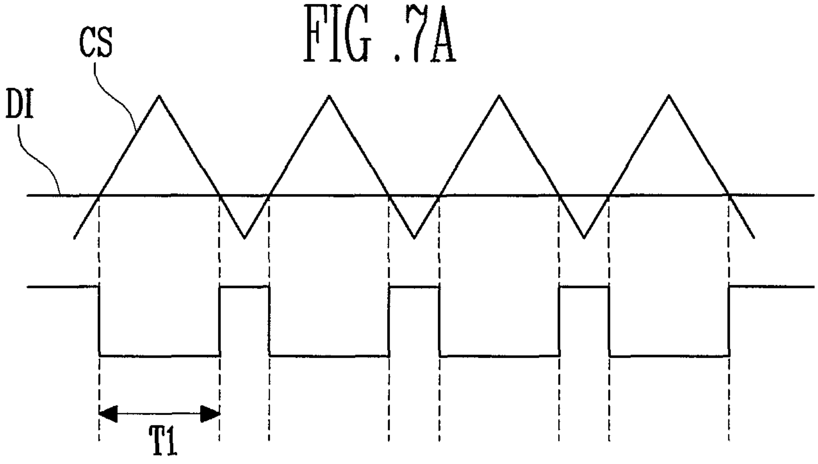
FIGS. 7A and 7B are diagrams showing a comparison result of a comparator included in a compensation unit, according to an embodiment of the present invention.

The comparator 191 is supplied with the deterioration information DI having a voltage (e.g., a predetermined voltage) from the sensing circuit 181. The comparator 191 that is supplied with the deterioration information DI compares the deterioration information DI with the comparison signal CS supplied from the timing controller 150 and supplies the comparison result to the controller 192. In one embodiment of the present invention, the comparator 191 compares the comparison signal CS supplied in a triangular waveform (as shown in FIG. 7A) with the deterioration information DI supplied in a direct current form, and outputs a high voltage when the voltage level of the deterioration information DI is higher than that of the comparison signal CS and outputs a low voltage when the voltage level of the comparison signal CS is higher than that of the deterioration information DI.

The controller 192 controls a turn-on time of the tenth transistor M10 included in the supply time controller 200 to correspond to the comparison result provided from the comparator 191. Here, the controller 192 controls the turn-on time of the tenth transistor M10 so as to compensate for the deterioration of the OLED to correspond to the comparison result.

The supply time controller 200 includes the tenth transistor M10 positioned in each channel. The tenth transistor M10 is turned on during a part of the driving period in response to a control signal of the controller 192.

Figure 6:
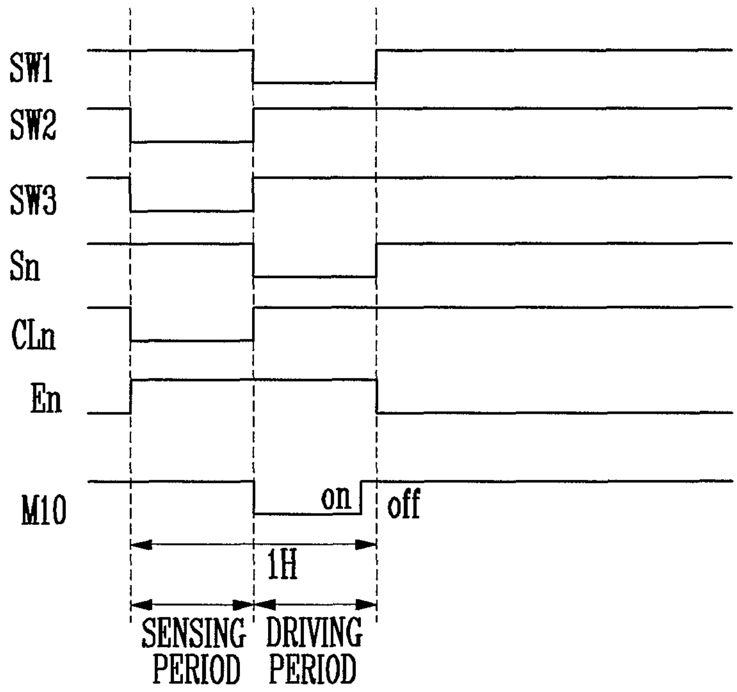
FIG. 6 is a waveform diagram showing a driving waveform supplied during a sensing period and a driving period, according to an embodiment of the present invention.

FIG. 6 is a waveform diagram showing an operation process during a sensing period and a driving period, according to one embodiment of the present invention. In FIG. 6, a driving waveform supplied to a pixel connected to an n-th scan line Sn and an m-th data line Dm is shown for the convenience of description.

The operation process is described in more detail referring to FIGS. 3 to 6. First, during the sensing period of the first horizontal period 1H, the second switching element SW2 and the third switching element SW3 are turned on, and, by the control signal supplied to the control line CLn, the fourth transistor M4 is turned on. In addition, by the emission control signal supplied to the emission control line En, the third transistor M3 is turned off.

When the second switching element SW2 and the third switching element SW3 are turned on, the first current from the current source unit 185 is supplied to the second power supply ELVSS via the third switching element SW3, the second switching element SW2, the data line Dm, the fourth transistor M4, and the OLED. Here, the deterioration information DI (e.g., a predetermined voltage) is applied to the anode electrode of the OLED, and the deterioration information DI is supplied to the comparator 191.

Figure 7B:
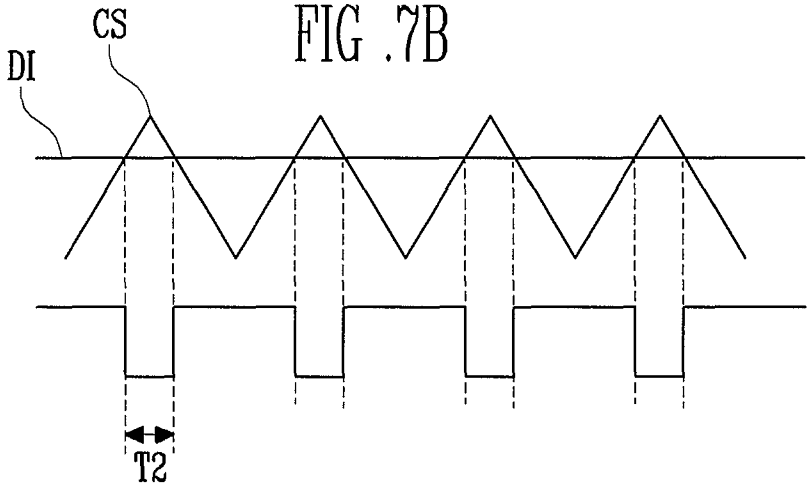

The comparator 191 compares a voltage value of the comparison signal CS supplied from the timing controller 150 with that of the deterioration information DI supplied from the sensing circuit 181 and supplies the comparison result to the controller 192. Here, when the deterioration information DI of the OLED is a low voltage with respect to the comparison signal CS, for example, when the OLED is not deteriorated, the comparator 191 supplies the comparison result having a low level during the first period T1 to the controller 192 as shown in FIG. 7A. In addition, when the OLED is deteriorated, the comparator 191 supplies the comparison result having the low level during a second period T2 that is shorter than the first period T1 to the controller 192 as shown in FIG. 7B.

Thereafter, during the driving period of the first horizontal period H1, the first switching element SW1 is turned on, and the scan signal is supplied to the scan line Sn. When the first switching element SW1 is turned on, the tenth transistor M10 is electrically connected with the data line Dm. When the scan signal is supplied to the scan line Sn, the first transistor M1 included in the pixel 140 is turned on.

Here, the controller 192 controls a turn-on time of the tenth transistor M10 to correspond to the comparison result provided from the comparator 191. For example, the controller 192 controls the turn-on time of the tenth transistor M10 to be in proportion to the low-level period (T1 or T2) of the comparison result.

Figure 8A:
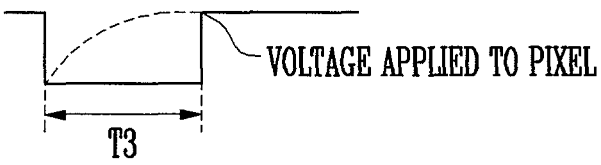
FIGS. 8A and 8B are diagrams showing an operation process of a controller included in a compensation unit, according to an embodiment of the present invention.

That is, when the comparison result having the low-level period of the first period T1 is inputted, the controller 192 turns on the tenth transistor M10 during a third period T3 which is a comparatively long time as shown in FIG. 8A. Here, the data signal supplied from the data driver 120 is supplied to the pixel 140 during the third period T3 when the tenth transistor M10 is turned on.

Figure 8B:
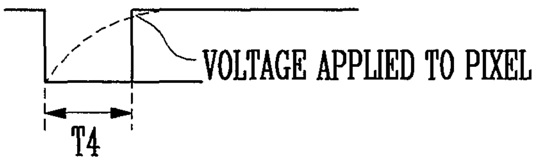

In addition, when the comparison result having the low-level period of the second period T2 is inputted, the controller 192 turns on the tenth transistor M10 during a fourth period T4 which is shorter than the third period T3 as shown in FIG. 8B. Here, the data signal supplied from the data driver 120 is supplied to the pixel 140 during the fourth period T4 when the tenth transistor M10 is turned on.

As the turn-on time of the tenth transistor M10 decreases, the voltage charged in the pixel 140 decreases to correspond to the data signal. That is, when the data signal is supplied to the pixel 140, the voltage charged in the storage capacitor Cst included in the pixel 140 gradually increases up to the voltage of the data signal. Here, when the supply time of the data signal decreases, the voltage charged in the storage capacitor Cst does not increase up to the voltage of the data signal, such that the storage capacitor Cst is charged with a voltage lower than a target voltage.

For example, when the data signal of 3V is supplied during the third period T3, a voltage of 2.9V may be charged in the storage capacitor Cst included in the pixel 140. However, when the data signal of 3V is supplied during the fourth period T4, a voltage of 2.6V may be charged in the storage capacitor Cst included in the pixel 140. Since the driving transistor M2 included in the pixel 140 is constituted by a PMOS transistor in one embodiment, as the voltage charged in the storage capacitor Cst decreases, the amount of current supplied to the OLED increases. That is, in one embodiment of the present invention, it is possible to compensate for the deterioration of the OLED by controlling the supply time of the data signal to decrease as the OLED deteriorates.

That is, in one embodiment of the present invention, it is possible to compensate for the deterioration of the OLED by controlling the supply time of the data signal to the pixel 140 to correspond to the deterioration of the OLED. Further, in one embodiment of the present invention, since a memory, etc. is not used to compensate for the deterioration of the OLED, when the switching unit 170, the sensing unit 180, the compensation unit 190, and the data driver 120 are implemented in an integrated circuit, it is possible to reduce the size thereof. In addition, in one embodiment of the present invention, gamma voltage is not changed in order to compensate for the deterioration of the OLED. Moreover, in one embodiment of the present invention, the deterioration of the OLED is measured in every horizontal period, and it is possible to compensate for the deterioration of the OLED to correspond to the measurement result.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:

a plurality of pixels at crossing regions of data lines, scan lines, and sensing lines;

a timing controller for generating a comparison signal to determine a deterioration degree of an organic light emitting diode included in each of the pixels;

a sensing unit for sensing a deterioration information of the organic light emitting diode;

a supply time controller coupled between the data lines and output lines of a data driver, wherein the supply time controller comprises a plurality of transistors, each of the plurality of transistors being coupled between a corresponding one of the output lines and a corresponding one of the data lines, wherein each of the output lines is coupled to only one of the transistors;

a compensation unit comprising a comparator and a controller coupled with the comparator, the compensation unit being configured to vary a turn-on time of the transistor so that a supply time of a data signal varies in accordance with the deterioration information and the comparison signal, wherein the comparator is configured to generate a first voltage when a voltage of the comparison signal is higher than a voltage of the deterioration information and otherwise, to generate a second voltage that is higher than the first voltage, and the controller is configured to control the turn-on time of the transistor in proportion to a duration of a period in which the first voltage is supplied from the comparator; and a switching unit coupled to the data lines, the sensing unit, and the supply time controller, the switching unit being configured to selectively couple the data lines to the sensing unit or the supply time controller.

2. The organic light emitting display device of claim 1, wherein the comparison signal comprises a triangular wave.

3. The organic light emitting display device of claim 1, wherein:

each of a plurality of channels comprise at least one of the data lines and the comparator, the comparator being configured to compare the comparison signal with the deterioration information; and the controller is configured to control a turn-on time of the transistor to correspond to a comparison result of the comparator.

4. The organic light emitting display device of claim 3, wherein the controller is configured to control the turn-on time so as to compensate for deterioration of the organic light emitting diode.

5. The organic light emitting display device of claim 1, further comprising:

a scan driver for sequentially supplying a scan signal to the scan lines;

a sensing line driver for sequentially supplying a sensing signal to the sensing lines; and a data driver for supplying a data signal to the data lines.

6. The organic light emitting display device of claim 5, wherein the sensing line driver is configured to sequentially supply the sensing signal during a sensing period which is a first period of a horizontal period, and the scan driver is configured to sequentially supply the scan signal during a driving period which is a second period of the horizontal period.

7. The organic light emitting display device of claim 6, wherein the transistor is configured to be turned on during at least a part of the driving period.

8. The organic light emitting display device of claim 6, wherein the switching unit comprises:

a first switching element coupled between a corresponding one of the data lines and the supply time controller; and a second switching element coupled between the corresponding one of the data lines and the sensing unit.

9. The organic light emitting display device of claim 8, wherein the first switching element is configured to be turned on during the driving period, and the second switching element is configured to be turned on during the sensing period.

10. The organic light emitting display device of claim 6, wherein the sensing unit comprises:

at least one current source for supplying a current to the organic light emitting diode; and at least one switching element coupled between the current source and the data lines.

11. The organic light emitting display device of claim 10, wherein the at least one switching element is configured to be turned on during the sensing period.

12. The organic light emitting display device of claim 10, wherein a current value of the current is the same as a current value of a current that flows through the organic light emitting diode and corresponds to a maximum luminance of one of the pixels.

13. The organic light emitting display device of claim 1, wherein a number of transistors is the same as a number of the output lines of the data driver.

14. A driving method of an organic light emitting display device, the method comprising:

determining a deterioration information of an organic light emitting diode included in a pixel while applying a current to the organic light emitting diode;

comparing a voltage of a comparison signal with a voltage of the deterioration information to generate a first voltage when the voltage of the comparison signal is higher than the voltage of the deterioration information and otherwise, generate a second voltage that is higher than the first voltage; and varying a turn-on time of a plurality of transistors to vary a supply time of a data signal supplied to the pixel in proportion to a duration of the first voltage, wherein the turn-on time of one of the transistors coupled to the pixel is different from the turn-on time of another one of the transistors coupled to another pixel in accordance with a comparison result of the comparing for the another pixel.

15. The driving method of an organic light emitting display device of claim 14, wherein the comparison signal comprises a triangular wave.

16. The driving method of an organic light emitting display device of claim 14, wherein as the organic light emitting diode deteriorates, the voltage of the deterioration information increases.

17. The driving method of an organic light emitting display device of claim 14, wherein the comparison result varies as the organic light emitting diode deteriorates such that the supply time of the data signal supplied to the pixel is reduced.

18. The driving method of an organic light emitting display device of claim 14, wherein the deterioration information and the comparison signal are compared with each other during a sensing period which is a first period of one horizontal period, and the supply time of the data signal is controlled during a driving period which is a second period different from the first period of the horizontal period.

* * * * *